United States Patent [19]

Yamanaka

[11] Patent Number: 4,686,562

[45] Date of Patent: Aug. 11, 1987

[54] GAMMA CORRECTION CIRCUIT

[75] Inventor: Junichi Yamanaka, Sagamihara, Japan

[73] Assignee: Kabushiki Kaisha Toshiba, Kawasaki, Japan

[21] Appl. No.: 837,960

[22] Filed: Mar. 10, 1986

[30] Foreign Application Priority Data

Mar. 30, 1985 [JP] Japan .............................. 60-47705[U]

[51] Int. Cl.⁴ ........................ H04N 9/69; H04N 5/202
[52] U.S. Cl. ........................................ 358/32; 358/164
[58] Field of Search .................................. 358/32, 164

[56] References Cited

U.S. PATENT DOCUMENTS 4,589,021 5/1986 Sato ........................................ 358/32

FOREIGN PATENT DOCUMENTS 50-14403 5/1975 Japan .
1205164 9/1970 United Kingdom .

Primary Examiner—Michael A. Masinick

Attorney, Agent, or Firm—Oblon, Fisher, Spivak McClelland, & Maier

[57] ABSTRACT

A gamma correction circuit superimposes gamma reference pulse on the input video signal and, after further superimposing this on a pedestal signal, gamma corrects the signal to the maximum value using a fixed gamma correction circuit and sends this corrected signal together with an uncorrected signal to a variable gamma correction circuit. The variable gamma correction circuit controls the input mixing ratio in response to the correction value control voltage to thereby determine the gamma correction value. After the gamma-corrected video signal has been clamped by the clamp circuit, it is supplied to the sample-and-hold circuit which detects the gamma reference pulse level superimposed on the input video signal, and holds it. This held voltage is added by the gamma correction value control circuit to the gamma correction control input and is sent to the variable gamma correction circuit as the correction value control voltage. In other words, a feedback loop for the variable gamma correction circuit is formed of the clamp circuit, sample-and-hold circuit and the correction value control circuit.

5 Claims, 4 Drawing Figures

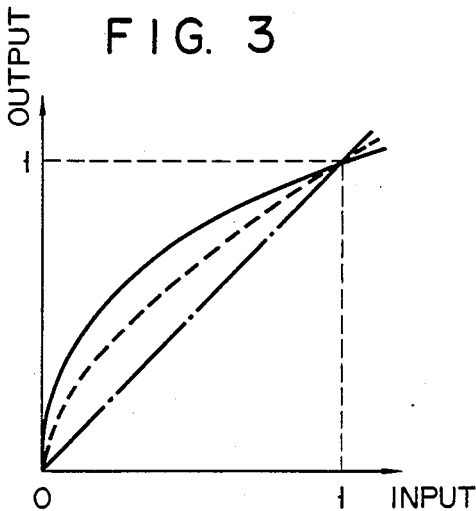
F I G. 3
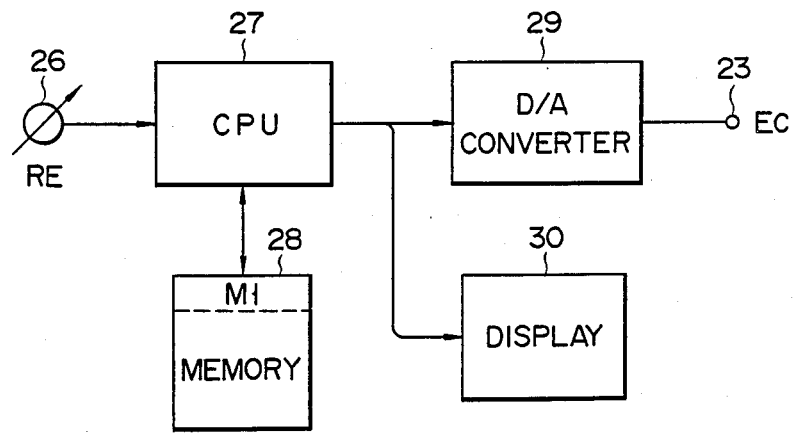
F I G. 4

GAMMA CORRECTION CIRCUIT

BACKGROUND OF THE INVENTION

This invention relates generally to a gamma correction circuit of a color television camera apparatus and particularly to an improvement whereby the gamma correction value can be adjusted stably and accurately.

Conventional broadcast color television cameras most commonly are the three-pickup tube type in which separate pickup tubes are used for each primary color, red, green and blue. The special feature of this type of camera is the excellent color reproduction and picture quality. The reason for this is that it is possible to provide a gamma correction circuit for the video signal processing circuit for each primary color, and it is possible to independently adjust the correction amount for each circuit.

A circuit constructed as shown in Japanese Utility Model No. 1111299 (KOKOKU 50-14403) is used to make the gamma correction circuit adjustable from the outside. These gamma correction circuits are constructed as fixed and variable. The fixed gamma correction circuit provides the maximum amount of gamma correction of the input video signal. The variable correction circuit is a mixing circuit which can vary the mixing ratio by varying the voltage (DC) controlling the gamma correction from the outside. This mixing circuit generally comprises a double balanced modulator type differential circuit which always outputs a constant value. In other words, this variable gamma correction circuit mixes an uncorrected signal with a signal that has been corrected to the maximum by the fixed gamma correction circuit. By varying the level of the gamma correction control voltage supplied to the variable gamma correction circuit, it is possible to vary the mixing ratio of the two signals and, accordingly, by adjusting the voltage level, it is possible to vary the amount of gamma correction.

However, with this kind of gamma correction circuit in which the above correction value adjustment means is used, drift (mostly temperature drift) occurs between transistors comprising the differential circuit of the variable correction circuit. When this drift occurs, the mixing ratio of the two signals varies, causing changes in the gamma correction amount. Even if such drift did not occur, with the above three-pickup tube type color television camera, variable correction circuits are provided for the video signal processing circuit of each primary color, resulting in variations in the characteristics of the transistors that comprise the different differential circuits so even if, for example, a uniform gamma correction control voltage is applied to each variable correction circuit, fluctuation would result between the maximum correction gamma signal and the uncorrected signal. This in turn would result in differences in the amount of correction provided by each circuit. Similarly, even if each correction circuit is of the fixed type, differences in gamma correction characteristics occur so the correction amount will vary even more.

Conventional color television cameras often use computers to automatically adjust the gamma correction amount. In this case the value of the gamma correction control voltage is digitally processed and only converted to an analog signal in the last stage. It is possible to display the numerical value of this digital value within the variable range of the gamma correction control voltage (using a CRT, LED or liquid crystal display to show the voltage value or percentage). However, the adjustment itself is analog controlled so regardless of how invariable the digital value of the control voltage is, the stability of the gamma correction is based on the stability of the differential circuit, resulting in errors because of the differences in characteristics between the gamma correction circuits of the primary colors. Accordingly, even if the gamma correction control voltage is shown in numerical values, the numerical value is no more than an estimate.

SUMMARY OF THE INVENTION

The object of the invention is to provide a gamma correction circuit which can decrease the correction result fluctuations caused by variations in characteristics and in drift of the transistors that comprise the differential circuits and which can carry out gamma correction stably and accurately even when the gamma correction value is adjusted externally for such correction result variations.

In the present invention a gamma correction circuit is provided, comprising: reference signal superimposing circuits for superimposing a reference signal within the blanking period of an input video signal; variable gamma correction circuits for inputting the video signal superimposed with a reference signal by the reference signal superimposing circuits, and determining a correction value in response to an externally supplied control signal; detection circuits for detecting a portion of the video signal corrected by the correction circuits that corresponds to the reference signal; and correction value control circuits for comparing the detection level of the detection circuits with control signal supplied to the gamma correction control circuits, varying the control signal and controlling the correction value of the variable gamma correction circuits based on this comparison result.

BRIEF DESCRIPTION OF THE DRAWINGS

This invention can be better understood in conjunction with the drawings, in which:

FIG. 3 is a graph showing the gamma correction characteristics of the circuit shown in FIG. 1; and FIG. 4 is a schematic of the circuit of FIG. 1 when gamma correction control voltage is controlled by a microcomputer.

DETAILED DESCRIPTION OF THE PREFERRED EMBODIMENT

Figure 1:
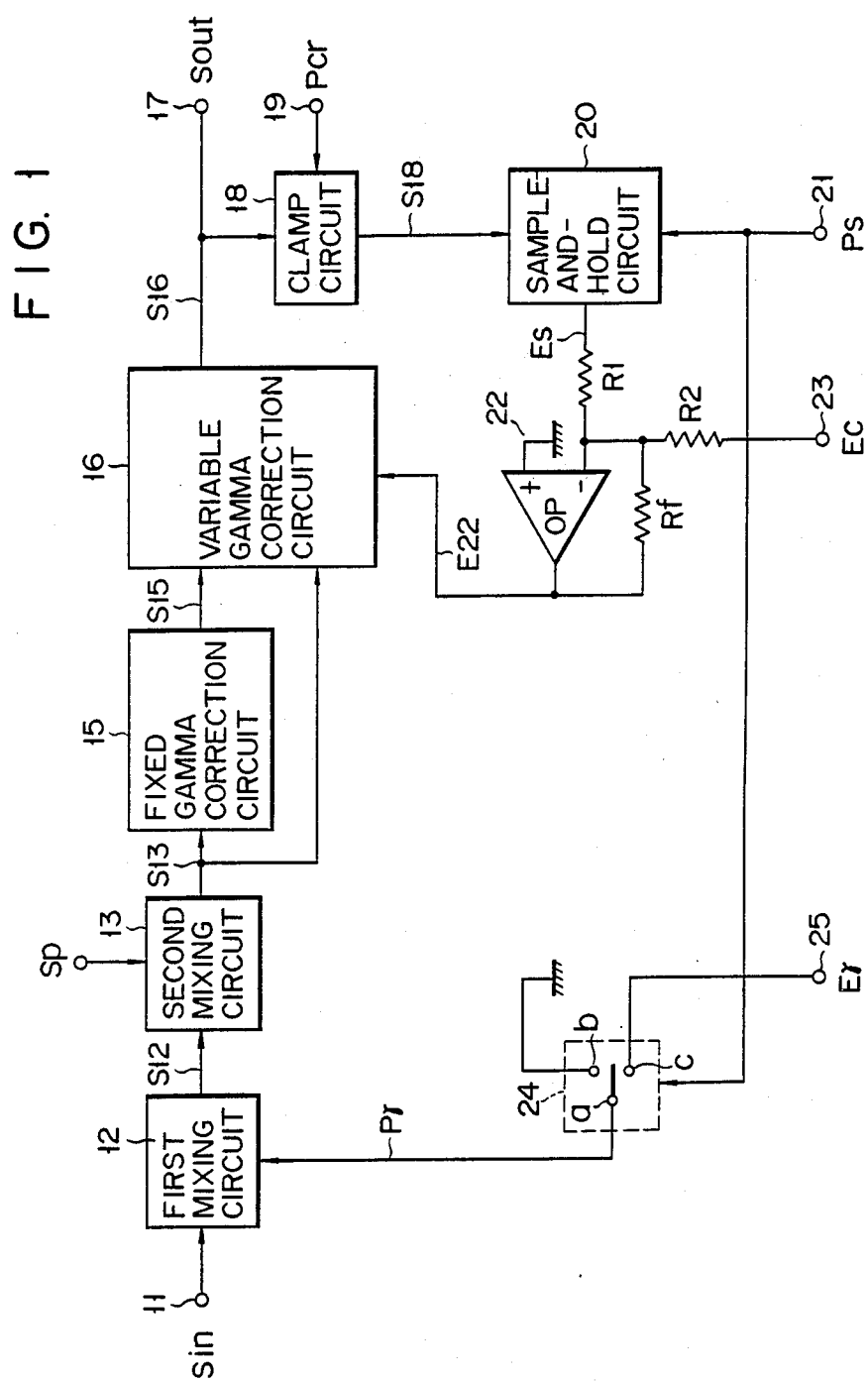
FIG. 1 is a schematic circuit diagram of the gamma correction circuit according to the first embodiment of this invention.

The gamma correction circuit according to the first embodiment will be described with reference to the drawings.

Video signal Sin, which is to be corrected, is supplied to a first mixing circuit 12 via input terminal 11. First mixing circuit 12 receives gamma reference pulse Pγ (to be explained later), superimposes it on the video signal Sin and supplies the resultant video signal S12 to the second mixing circuit 13. Second mixing circuit 13 superimposes the pedestal signal Sp input via first control input terminal 14 onto input video signal 13 and the resultant video signal S13 is supplied to fixed gamma correction circuit 15 and to variable gamma correction circuit 16. Fixed gamma correction circuit applies the maximum gamma correction value to input video signal S13 and this gamma-corrected video signal S15 is supplied to variable gamma correction circuit 16.

Variable gamma correction circuit 16 comprises a double balanced modulator type differential circuit, as was described earlier, and supplies two input video signals, signal S15, which has been gamma corrected by the maximum amount, and signal S13, which has not been gamma corrected at all, to each input of the differential circuit. The differential circuit is constructed such that it always outputs a constant value and the mixing ratio of the two inputs can be varied by varying the gamma correction control voltage (DC). Video signal S16 corrected by variable gamma correction circuit 16 is output via terminal 17 and supplied to clamp circuit 18.

Clamp pulse Pcr is input to clamp circuit 18 via second control input terminal 19 and during this pulse input period clamp circuit, clamps input video signal 16 to 0 V. Clamped video signal 18 is supplied to sample-and-hold circuit 20, to which a sample pulse Ps is input via third control input terminal 21. Based on sample pulse Ps, input video signal S18 is sampled and held and the held voltage Es is supplied to gamma correction control circuit 22.

Via resistors R1, R2, gamma correction circuit 22 adds the hold voltage Es and the gamma-corrected control voltage Ec input via fourth control input terminal 23. This addition signal is amplified by operation amplifier OP whose gain is set by feedback resistor Rf and the amplified output E22 is supplied to variable gamma correction circuit 16 as the correction value control voltage. Clamp circuit 18, sample-and-hold circuit 20 and gamma correction value control circuit 22 form a feedback loop for variable gamma correction circuit 16.

Sample pulse Ps is supplied to the control input terminal 21 of switching circuit 24. Switching circuit 24 may be an analog switch comprising FETs, for example. Variable input terminal a is connected to the control input terminal of first mixing circuit 12 and the fixed terminal b is connected to ground, while the other fixed terminal c is connected to the fifth control input terminal 25. Reference voltage Eγ is supplied to the fifth input terminal 25. In other words, switching circuit 24 switches the connection of variable terminal a to either fixed terminal b or c in accordance with sample pulse Ps to thereby generate gamma reference pulse Pγ of the amplitude level Eγ, and supply this pulse Pγ to mixing circuit 12.

Figure 2:
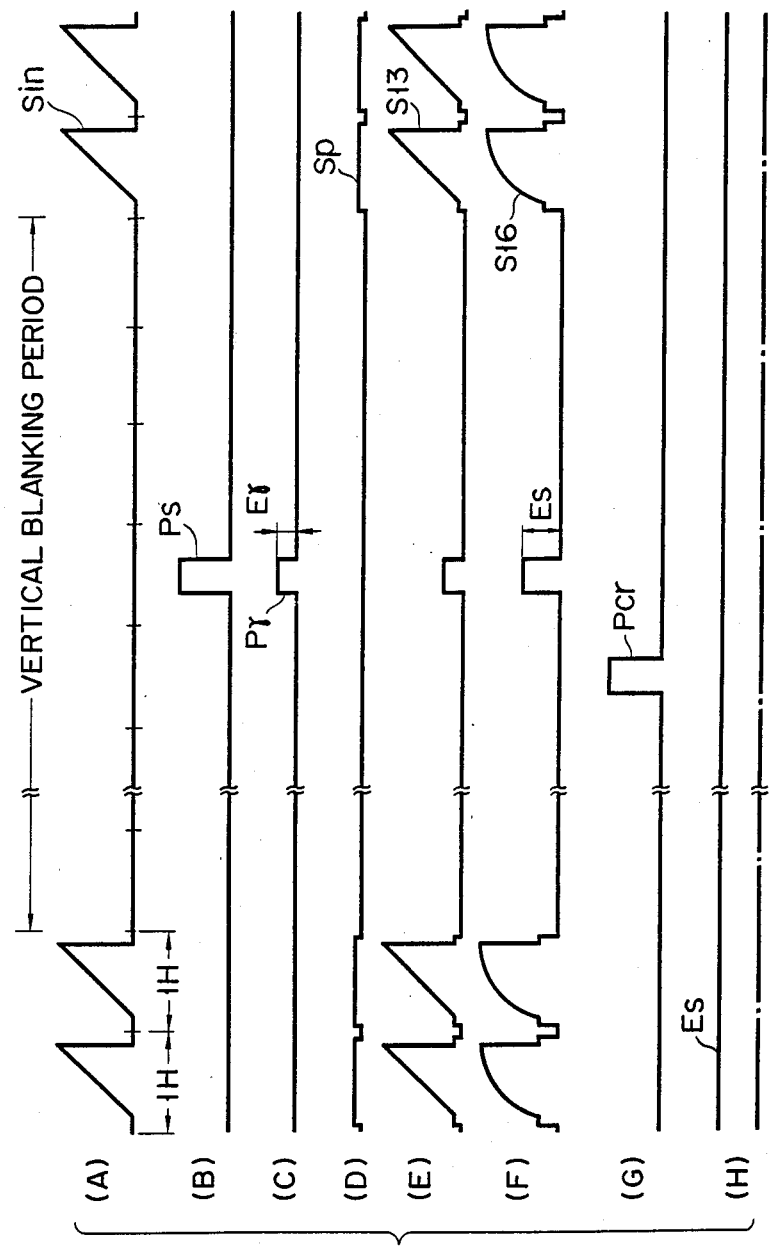
FIGS. 2A to 2H are waveform drawings showing the operation of the circuit shown in FIG. 1.

The operation of the above device is described in conjunction with FIGS. 2 and 3.

When the video signal Sin that is to be gamma corrected has the waveform shown in FIG. 2(A) and is supplied to input terminal 11, sample pulse Ps is generated within the vertical blanking period of signal Sin, as is shown in FIG. 2(B), and is supplied to switching circuit 24 via the third control input terminal 21 and to sample-and-hold circuit 20. Normally, switching circuit 24 switches the connection of terminal a to the terminal b side but, when a sample pulse Ps is input, switches the connection to the terminal c side. Consequently, switching circuit 24 generates a gamma reference pulse Pγ with an amplitude level Eγ and at the timing shown in FIG. 2(C). This pulse Pγ is supplied to the first mixing circuit 12 and mixed with video signal Sin that was input from input terminal 11 for gamma correction.

Pedestal signal Sp supplied to the first control input terminal 14 has the waveform shown in FIG. 2(D) in relation to the video signal Sin shown in FIG. 2(A). Consequently, output S13 of the second mixing circuit 13, which mixes output S12 of the first mixing circuit 12 and pedestal signal Sp, is as shown by (E) in FIG. 2. Video signal S13, which is obtained in this way, is supplied to variable gamma correction circuit 16 after being gamma corrected to the maximum value by fixed gamma correction circuit 15 and directly to variable gamma correction circuit 15 as well. The video signal S13 that is to be gamma corrected by fixed gamma correction circuit 15 must be DC-fixed before being input. For example, before being supplied to input terminal 11, video signal Sin is DC-fixed and then is mixed with gamma reference pulse Pγ and pedestal signal Sp.

The gamma correction characteristics of variable gamma correction circuit 16 are shown in FIG. 3. The chain line circle is the characteristic for when the gamma correction value is 1; the solid line is for when the correction value is the maximum, e.g., 0.35; the broken line is for when the correction value is set at 0.45 by correction value control voltage E22. Namely, variable gamma correction circuit 16 is able to freely adjust the gamma correction value between the maximum of 0.35 and 1 by varying the gamma correction control voltage because the input ratio of the maximum corrected signal S15 and the uncorrected signal S13 is kept constant by the operation of the differential circuit. Video signal S16, which is corrected by this variable gamma correction circuit 16, has the form shown in FIG. 2(F) and is supplied via output terminal 17 to the color adjustment circuit in a later stage as well to clamp circuit 18.

Clamp pulse Pcr is supplied to clamp circuit 18 at the timing shown in FIG. 2(G), i.e, before sample pulse Ps in the vertical blanking period is generated. At the time clamp pulse Pcr is input, input video signal S16 is clamped at the 0 V level. This clamped video signal S18 is supplied to sample-and-hold circuit 20.

Sample pulse Ps is applied to sample-and-hold circuit 20 at the timing shown in FIG. 2(B) so circuit 20 holds the level Es of the reference pulse, which is superimposed on the video signal S18 as shown in FIG. 2(H). The held voltage Es is added to gamma control voltage Ec by gamma correction control circuit 22 and is amplified to become the correction value control voltage E22.

The above operation is described in greater detail below.

Gamma correction control voltage Ec is adjusted, output E22 of gamma correction control circuit 22 drops and gamma correction value 1 of variable gamma correction circuit 16 approaches 1. At this time, if the amplification ratio of gamma correction control circuit 22 is sufficiently large, the balanced state of the feedback loop mentioned earlier is determined by gamma correction control voltage Ec. That is $$ES/R1 = Ec/R2 \tag{1}$$

where $Rf >> R1$, $R >> R2$

Gamma reference pulse Pγ, which is mixed with input video voltage Sin by first mixing circuit 12, is changed from level Eγ to ES, as shown in FIG. 2(F), based on the result of gamma correction with variable gamma correction circuit 16 and fixed gamma correction circuit 15. Accordingly, Eγ and Es have the relationship of K(Eγ)γ=Es (K is a constant).

In this case γ is the gamma correction value of the gamma correction characteristic shown in FIG. 3 and, if the maximum gamma value (the output of fixed gamma correction circuit 15) is taken as being 0.35, for example, γ can be varied by variable gamma correction circuit 16 within the range $0.35 \leq \gamma \leq 1$. With the relationship Es/R1=Ec/R2, the above feedback loop is balanced so the relationship K(Eγ)γ/R1=Ec/R2 is established. That is can be expressed by the function $$\gamma = f(Ec, E\gamma, R1, R2) \qquad (2)$$

Here R1, R2 are constants so, if Eγ is determined, γ becomes a function which is varied only by Ec. In other words, the drift of variable gamma correction circuit 16 has absolutely no effect on the control of γ because gamma correction control circuit 22 operates as a high gain feedback amplifier. As can be understood from Equation (2), if Ec is fixed, γ becomes the function by which Eγ is varied so even if Eγ is adjusted instead of Ec, it is still possible to perform gamma correction. In this description Eγ was fixed and Ec was adjusted.

When reference voltage Eγ is set at 27% of the prescribed input level, for example, the gamma correction value γ becomes 0.45, which is the video level corresponding to the grey reflection level exactly in the center (hereafter referred to as the cross point) of the grey scale. Normally, in controlling the gamma correction, the level is set as being a certain percentage of this cross point. If reference voltage Eγ is set to the above level and R1=R2, then Es=Ec, K(Eγ)γ=Es. Accordingly, if the gamma correction control voltage Ec is converted from a value found by multiplying the percentage of the desired cross point with the voltage value corresponding to the prescribed level of the output signal Sout and this value is applied to gamma correction control circuit 22, the feedback loop is able to stabilize the cross point at the desired value.

FIG. 4 shows the structure when the gamma correction control voltage Ec is controlled by a microcomputer. Reference numeral 26 denotes the rotary encoder RE, which selects the cross point from a possible range of 0 to 100% in n steps, and generates digital data corresponding to the selection value. The generated digital data is supplied to CPU 27, which produces a readout address from this generated digital data and supplies this to memory 28. Memory 28, for example, stores the digital value of the gamma correction control voltage Ec in n steps corresponding to the percentage of the cross point in memory region M1.

CPU 27 is programmed to read out from memory 28 the digital value corresponding to the input digital data based on the readout address data and send this data to D/A converter 29 and to display 30. D/A converter 29 generates an analog voltage from the input value and supplies this to the fourth control input terminal 23 as the gamma correction control voltage Ec. Display 30 shows the input digital values from 0 to 100% using LEDs, for example.

With this kind of structure, it is possible to control the gamma correction control voltage Ec as a digital value and to display the digitalized numerical value. Also, if the gamma reference pulse Pγ is fixed, it is possible to stably and accurately adjust the gamma correction value because the gamma correction value is a function that is varied only by Ec.

Accordingly, with a gamma correction circuit that is constructed as was described above, the characteristics are varied based only on the gamma correction control voltage Ec so it is possible to freely vary the gamma correction characteristics while greatly reducing circuit drift. With three-pickup tube color cameras in which there is a plurality of signal processing systems, it is possible to greatly reduce the gamma drift between circuits for each primary color. Also, if the gamma reference input Eγ between each of the circuits is accurately controlled or controlled in common, it is possible set the relationship of the gamma values of each circuit simply using their relationship to gamma correction control voltage Ec. (If the circuit shown in FIG. 4 is used, it possible for the control to be entirely numerical). Consequently, the gamma value between the circuit of each primary color has high reproducibility in relation to the gamma correction control voltage Ec. Also, if a value with a particular meaning is used for gamma reference input Pγ (such as the cross point, for example), it is possible to directly control this particular value (numerical display is also possible).

The invention is not restricted to the above embodiment. For example, if the timing of the sampling and holding is within the blanking period of the video signal, it does not matter whether the blanking period is that of the vertical or the horizontal.

As was described earlier, even if the gamma correction control input Ec is fixed and the gamma reference input Eγ is adjusted, the same effect can be obtained as in the above embodiment. Furthermore, it is also possible to set the gamma value using the DC input as the variable gamma correction means.

What is claimed is:

1. A gamma correction circuit, comprising:
reference signal superimposing means for superimposing a reference signal within the blanking period of an input video signal;
variable gamma correction means for inputting the video signal superimposed with a reference signal by said reference signal superimposing means, and determining a correction value in response to an externally supplied control signal;
detection means for detecting a portion of the video signal corrected by said correction means that corresponds to said reference signal; and
correction value control means for comparing the detection level of said detection means with a control signal supplied to said gamma correction control means, varying said control signal and controlling the correction value of said variable gamma correction means based on this comparison result.

2. A gamma correction circuit according to claim 1, wherein said reference signal superimposing means superimposes the reference signal within a vertical blanking period of the input video signal.

3. A gamma correction circuit according to claim 1, wherein said reference signal superimposing means superimposes the reference signal within a horizontal blanking period of the input video signal.

4. A gamma correction circuit according to claim 1, wherein either said reference signal or said gamma correction control input is fixed or variable.

5. A gamma correction circuit according to claim 1, wherein the control input of said variable gamma correction means is a direct current voltage.

* * * * *